United States Patent [19]

Short et al.

[11] Patent Number: 4,522,986

[45] Date of Patent: Jun. 11, 1985

[54] UREA FLOW CONTROL AGENTS FOR URETHANE PAINT PREPARED BY REACTION OF AN ISOCYANATE-TERMINATED PREPOLYMER AND AN ETHANOLAMINE

[75] Inventors: William T. Short, Southfield; Robert A. Ottaviani, Washington, both of Mich.

[73] Assignee: General Motors Corporation, Detroit, Mich.

[21] Appl. No.: 633,025

[22] Filed: Jul. 20, 1984

[51] Int. Cl.$^3$ .............................................. C08G 18/10
[52] U.S. Cl. .................................... 525/458; 528/59; 528/60; 528/65
[58] Field of Search .................... 525/458; 528/60, 59, 528/65

[56] References Cited

U.S. PATENT DOCUMENTS

| | | | |
|---|---|---|---|
| 3,893,956 | 7/1975 | Brandt | 528/49 |
| 3,935,051 | 1/1976 | Bender et al. | 528/78 |
| 4,029,626 | 6/1977 | Gillemot et al. | 528/60 |
| 4,311,622 | 1/1982 | Buter | 525/128 |
| 4,383,068 | 5/1983 | Brandt | 524/196 |
| 4,387,194 | 6/1983 | Ottaviani et al. | 528/51 |

Primary Examiner—Maurice J. Welsh
Attorney, Agent, or Firm—Randy W. Tung

[57] ABSTRACT

Urethane-urea flow control agents are synthesized by a two-step process. First, an isocyanate-terminated urethane prepolymer is prepared by reacting a polyether polyol with a stoichiometric excess of a saturated cyclic aliphatic polyisocyanate. These isocyanate-terminated prepolymers are then modified by reaction with an ethanolamine to form urea endcapped flow control agents having number average molecular weight of between 1000 and 4000. These urea endcapped flow control agents can be blended with any urethane paint system and be compatible in structure. They have shown specifically superior compatibility with melamine cured high solids urethane paint systems. When blended with pigmented urethane paint at relatively small amounts, these flow control agents greatly reduce sagging while maintaining excellent leveling and viscosity properties of the paint.

3 Claims, 3 Drawing Figures

4,522,986

UREA FLOW CONTROL AGENTS FOR URETHANE PAINT PREPARED BY REACTION OF AN ISOCYANATE-TERMINATED PREPOLYMER AND AN ETHANOLAMINE

BACKGROUND OF THE INVENTION

This invention relates to urea flow control agents which are compatible with melamine cured urethane paint, and a method of making such agents. The invention further relates to high solids urethane paint compositions, the flow characteristics of which are modified by the incorporation of such flow control agents.

Earlier work by the inventors hereof led to the development of novel, ultraviolet (U.V.) stable urethane binder compositions which are the subject matter of U.S. Pat. No. 4,387,194, assigned to General Motors Corporation, issued June 7, 1983. One such composition that was used in the current invention is prepared by reacting a hindered piperidinol U.V. stabilizing agent with a substantial stoichiometric excess of alkyl polyfunctional isocyanate. This reaction yields a piperidine group terminated isocyanate prepolymer. The isocyanate prepolymer is then reacted with a stoichiometric excess of polyether polyol, preferably a mixture of polyoxypropylene diols and triols. The diol to triol ratio may be adjusted to provide desired hardness, toughness and flexibility in the cured paint. The colored paints are pigmented at a ratio of about 40 parts pigment per 100 parts resin.

The preferred cross-linking agent for the piperidinol U.V. stabilized paints is a partially methylolated melamine resin. In acid environments (pH preferably less than 5) and at elevated temperatures above about 250° F. the melamine formaldehyde reacts rapidly with the hydroxy end groups of the U.V. stabilized urethane resin to form a complex, cross-linked polymeric structure.

These high solids paints are easy to apply to substrates by spray application even though their nonvolatile solids (resin and pigment) content may be well over 50%. However, their viscosities and thixotropic properties are such that after application, they are prone to run and sag when applied to vertically oriented substrates. Thus, improved flow control of these paint compositions is critical to their greater utility in automotive applications where coatings may be sprayed onto vertically oriented body panels or parts with complex surface contours.

To obtain acceptable flow control, the coating must have the proper rheology during the application, flash, and bake periods. The two major factors for proper flow control are film leveling and film sagging. Film leveling involves a coating flowing out after application so as to obliterate surface irregularities such as orange peel and cratering. Film sagging involves a downward movement due to gravity of a vertical paint film after application and before cure which results in an uneven coating having a thick lower edge. In an ideal situation, a coating will level completely but have no sag. However, those factors that give good leveling, such as low coating viscosity, also serve to promote sagging. A compromise between good leveling and good sag resistance is required.

Desired rheological behavior for a sprayed paint coating is that it has a very low viscosity when subjected to high shear in the paint spraying process. However, once the paint has been applied to a substrate, the viscosity should increase enough so that the paint does not sag or drip but not so much that it fails to level. With conventional low solids-high solvent enamel paint systems, rheological control is maintained by controlling the rate of solvent evaporation. However, such control is not possible with a high solids paint.

Furthermore, the thixotropic particulate and polymeric fillers used in conventional paint systems to control viscosity are not useful in our acid catalyzed, melamine cured urethane paints. When fillers were added in amounts adequate to effect thixotropy, it was only at the expense of other important coating properties such as gloss, durability, leveling, distinctness of image or spray solids concentration.

Accordingly, it is an object of this invention to provide a flow control agent which, when added to high solids, melamine cured urethane paints will improve the flow characteristics of such paints, particularly to promote ease of spraying and adequate leveling while inhibiting drip and sag.

It is another object of this invention to provide a method of making such flow control agents by reacting a mixture of polyoxypropylene diols and triols with an excess of methylene-bis-(4-cyclohexyl isocyanate) and thereafter reacting the product of this reaction with various substituted ethanolamines to create a urethane-urea polymer having strong hydrogen bonding and polar end groups.

It is yet another object of this invention to provide a high solids, melamine cured urethane paint formulation containing a urethane-urea flow control agent such that the paint is sprayable in a production environment, curable in a relatively short period of time at relatively low temperatures, and spreadable when wet without dripping or sagging.

BRIEF SUMMARY OF THE INVENTION

In accordance with our invention, a urethane-urea flow control agent can be synthesized by a two-step process. First, an isocyanate-terminated urethane prepolymer is prepared by reacting a polyether polyol with a stoichiometric excess of a saturated cyclic aliphatic polyisocyanate. The polyether polyol used is preferably a mixture of polyoxypropylene oxide diols and triols in a ratio of diol to triol of about 1:1. Saturated cyclic aliphatic polyisocyanate is preferred over unsaturated cyclic, straight chain or branched isocyanates for its ultraviolet stability. A preferred polyisocyanate for the subject invention is methylene-bis-(4-cyclohexyl isocyanate).

These isocyanate terminated prepolymers are then modified by reaction with an ethanolamine. The amine portion of the ethanolamine preferentially reacts with the isocyanates to form urea linkages while the hydroxyl groups of the ethanol become terminal functional groups. Both the urethane and urea linkages are stable when the resin is completely cured.

The ethanolamine endcapped flow control agents are oligomers in nature having number average molecular weight of between 1000 and 4000, and weight average molecular weight of between 3000 to 12000. They can be added to any urethane paint system and be compatible in structure. Specifically, these agents have shown superior compatibility with melamine cured high solids urethane paint systems. When blended with urethane paint at relatively small amounts, e.g., between 1 to 5 weight percent, these flow control agents greatly reduce sagging while maintaining excellent leveling property of the paint.

A unique feature of this invention is the incorporation of polar urea linkages in the flow control agent. It is believed that these linkages cause secondary bonding to form between the flow control agents and tie molecules of small particle size before the paint is cured. This secondary bonding is upset by the application of stress in the paint spraying process so that the viscosity under spray conditions is reduced, i.e., exhibiting a shear-thinning behavior. However, once the uncured resin is applied to a substrate, secondary bonding takes place which helps to prevent sag and drip, but the uncured resin still flows enough to have good leveling properties. It is believed that the primary source of this secondary bonding in the uncured resin is the interaction between the urea groups and the pigment particles serving as tie molecules. A preferred pigment would be titanium oxide which is conventionally used to make white paints.

Accordingly, the subject invention when blended with a urethane paint provides durable paint finishes which can be applied by spraying or spreading. Secondary bonding associations between polar urea linkages in the paint resin and the paint pigment prevent sag and drip before the paints are cured. The inclusion of these urea linkages in the uncured resin has not been found to interfere with any other exceptional qualities of urethane paints.

DETAILED DESCRIPTION

The objects and advantages of our invention will be better understood in view of the figures in which.

Figure 1:
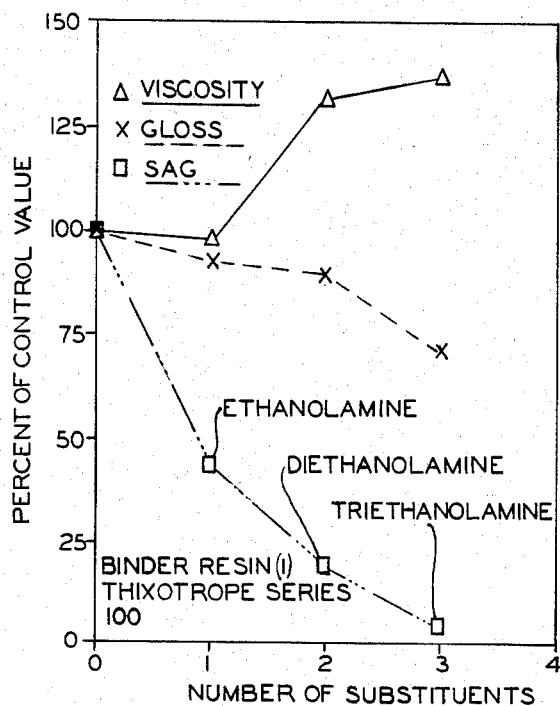
FIG. 1 is a plot of viscosity, gloss, and sag properties of titanium oxide pigmented (white) melamine cured enamels where the resins were prereacted with ethanolamine, diethanolamine or triethanolamine.

The invention may be better understood in view of the following description and specific examples.

It is well known that saturated cyclic aliphatic polyisocyanates are more stable to ultraviolet radiation than unsaturated cyclic, straight chain or branched isocyanates. Therefore, the preferred polyisocyanates for the subject invention include such compositions as methylene-bis-(4-cyclohexyl isocyanate), isophorone diisocyanate, hexamethylene diisocyanate, and 1,4-cyclohexane bis(methyl isocyanate). The first-mentioned compound is a preferred diisocyanate for the subject invention. It is a liquid sterioisometric mixture originally sold under the trade name of "Hylene W" by Dupont that is available as of the filing date thereof as Desmador-W ®, sold by Mobay. The material is sometimes generically referred to as $H_{12}MDI$. Analysis showed the material as received to be greater than about 99.2% pure. The isocyanate constituent should have a functionality of at least about 2 to promote a chemically cross-linked paint product.

In the subject compositions, the paint is cured by cross-linking hydroxyl groups carried on either a polyether constituent or an alkylolamine. The isocyanate groups are fully reacted when the resin is endcapped with alkylolamine.

The flexibilizing constituents of the subject urethane paints are preferably polyether polyols. These polyols have been found to provide conventional moisture cured urethane paints with such properties as high gloss, distinctness of image, impact resistance and chip resistance. The preferred polyethers are blends of polyoxypropylene diols and triols. Other polyether polyols such as those based on polyethylene oxide may also be used if they have suitable U.V. stability and workable viscosities. Table I lists a number of polyethers that were used.

TABLE I
SELECTED POLYPROPYLENE OXIDE POLYETHERS

| Material[a] | Functionality | % Solids | Viscosity @ 25° C. (Centipoise) | Hydroxyl Number | Molecular Weight |
|---|---|---|---|---|---|
| P-410 | 2 | 100 | 75 | 265 | 424 |
| P-1010 | 2 | 100 | 150 | 105 | 1050 |
| TP-440 | 3 | 100 | 600 | 398 | 423 |
| TP-1540 | 3 | 100 | 350 | 110 | 1530 |

[a] All polypropylene oxide polyethers were obtained from BASF Wyandotte under the trade name Pluracol ® resins.

Alkylolated amino resins are known cross-linking agents for industrial coatings. Outstanding properties such as hardness, high gloss, clarity and durability are provided by melamine curatives. Thus, melamine cross-linking agents are preferred for our novel U.V. resistant urethane coatings. We have found partially methylolated melamine resins to be suitable. These are commercially available and may be formed by reacting less than six moles of formaldehyde with one mole of melamine in a methanol solution. The reaction yields a methylolated melamine by the addition of hydroxy methyl groups to the amine groups of the melamine resin. A preferred curing agent for this invention is trimethylol melamine dissolved in butanol that is sold by American Cyanamid under the trade designation Cymel ® 325. Generally, the melamine curing agent should be present in amounts adequate to react with substantially all of the free hydroxyl groups of a urethane binder resin to be cross-linked. About 40 grams of trimethylol melamine was used per equivalent of free hydroxy to cure the subject urethane binder resins.

In order to cure the subject paint resins in reasonable times at relatively low temperatures, it is necessary to catalyze, i.e. accelerate, the melamine cross-linking reaction. The preferred catalysts are weak acids soluble in organic solvents. A preferred catalyst is dimethyl pyrophosphoric acid (DMPA) sold by American Cyanamid as Cycat ® 296.9.

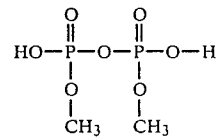

About 2 to 5 weight percent DMPA (excluding solvent weight) as used based on the weight of trimethylol melamine, about 3% being preferred.

Compatible solvents such as cellusolve acetate, methyl ethyl ketone (MEK), butyl alcohol, etc., are incorporated consistent with normal paint practices. Likewise, pigments, fillers, and other paint additives may be incorporated so long as they do not interfere with the invention.

The key feature of this invention is the synthesis and incorporation of small amounts of specially formulated urethane-urea polymers in high solids, melamine-cured urethane enamels to control their flow behavior. These polymers are specifically designed for compatibility with the paint and to increase viscosity promoting secondary bonding association structures in the enamels as they cure.

The theory supporting the paint flow control provided by reference. The binder resin used for work on the subject flow control system consisted of equal weight portions based on resin solids of Cymel® 325 melamine resin and one of two experimental polyether-polyurethane binder resins. The two binders differed in urethane content and residual level of non-chain extended polyol. Table II sets out information about hydroxy-terminated polyurethane resins used as coating binders, Resin Nos. 1 and 2, and isocyanate-terminated urethane resins used to synthesize urea thixotrope, Resin Nos. P100 and P200.

TABLE II

STRUCTURAL CHARACTERIZATION OF POLYURETHANE RESINS USED AS COATING BINDERS AND THIXOTROPE PRECURSORS

| Resin # | Milliequivalents | | | Equiv. Weight | | | NCO:OH | Coeff. Branching | $MN^c$ All Species | $MN^d$ Chain Species | Residual Free Monomer (Weight Percent) | | | $M_n$ | $M_w$ | $M_w/M_n$ |
|---|---|---|---|---|---|---|---|---|---|---|---|---|---|---|---|---|
| | Diol | Triol | $ISo^e$ | Diol | Triol | $ISo^e$ | | | | | Diol | Triol | $ISo^e$ | | | |
| $1^a$ | 3.18 | 3.16 | 2.64 | 212 | 142 | 131 | 0.42 | 0.50 | 1110 | 2080 | 15.6 | 6.0 | — | 1200 | 2300 | 1.9 |
| $2^b$ | 3.00 | 3.00 | 3.00 | 212 | 142 | 131 | 0.50 | 0.50 | 1450 | 2540 | 10.9 | 3.7 | — | 1600 | 3200 | 2.0 |
| $P100^b$ | 0.69 | 2.11 | 8.09 | 525 | 195 | 131 | 3.00 | 0.78 | 762 | 2100 | — | — | 26.3 | — | — | — |
| $P200^b$ | 0.85 | 0.23 | 2.08 | 212 | 212 | 131 | 1.95 | 0.21 | 1700 | 1890 | — | — | 12.8 | — | — | — |

$^a$Hydroxy-terminated urethane resins used as binders.
$^b$Isocyanate-terminated urethane resins used in thixotrope synthesis.
$^c$Number average molecular weight of all polymer species.
$^d$Number average molecular weight of all polymer species except monomer.
$^e$Methylene bis(4-cyclohexylisocyanate)

vided in accordance with this invention is as follows. In general, it has been found that the viscosity behavior of coatings under high shear rate conditions (such as spraying through a small orifice under pressure) are dominated by the properties of the binder resins, pigments and solvents. Under the ultra low shear rate condititons following deposition and before cure, the flow properties are dominated by solvent evaporation and the formation of weak, easily disrupted secondary bonding association structures. The secondary bonding association effect is more signficant in high solids/low solvent paints. In our paint, it is believed that the polar urea linkages on the specifically formulated urethane-urea resin constituents are particularly adapted to form ionic bonds with the filler constituent and, to a lesser extent, with the melamine curing agent.

The constituent that is reacted with a portion of the isocyanate resin precursor to form these urea linkages is an amine which is mono-, di- or tri-substituted with hydroxyl terminated alkane groups where the maximum alkane chain length is less than about ten carbon atoms. The preferred reactant is diethanolamine, although ethanolamine and triethanolamine are also useful.

Experimental Background

Unless otherwise stated, reagent grade chemicals were used as received. Acetone and 2-pentanone were dried over Linde® 3A molecular sieves before use as solvents for free isocyanate. Methylene-bis-(4-cyclohexyl isocyanate) sold by Dupont under the trade name Hylene®W was filtered through glass frit to remove any urea or polymeric contaminants formed upon storage.

Ethanolamine, diethanolamine and triethanolamine were obtained from Aldrich Chemical Co. Puracol® polyoxypropylene glycols were obtained from BASF Wyandotte, Inc., and the Cymel® 325 melamine-formaldehyde resin was obtained from the Cyanamid Co.

The synthesis and composition of the base urethane-melamine paint whose flow characteristics are improved in accordance with this invention are fully set out in U.S. Pat. No. 4,387,194 which is hereby incorporated by reference. The binder resin used for work on the subject flow control system consisted of equal weight portions based on resin solids of Cymel® 325 melamine resin and one of two experimental polyether-polyurethane binder resins. The two binders differed in urethane content and residual level of non-chain extended polyol. Table II sets out information about hydroxy-terminated polyurethane resins used as coating binders, Resin Nos. 1 and 2, and isocyanate-terminated urethane resins used to synthesize urea thixotrope, Resin Nos. P100 and P200.

The weight and number average molecular weights of the polyol precursors were confirmed by gel permeation chromatography.

Unless otherwise noted below, the procedure used to synthesize the urea flow control agents entailed preparation of an isocyanate-terminated urethane resin by the reaction of a mixture of polyoxypropylene diols and triols with an excess of methylene-bis-(4-cyclohexyl isocyanate). These resins were further modified by reaction with stoichiometric amounts of alkylolamines to produce strongly hydrogen bonding incorporated urea groups. This two-step process permits control of the structure of the urethane backbone. For example, the molecular weight, branching, proportion of unreacted isocyanate, polyol structure, etc., can be readily adjusted. Resin Nos. P100 and P200 were endcapped with ethanolamine, diethanolamine and triethanolamine as will be described in detail hereinafter. Table III sets out the number and weight average molecular weights for these flow control resins.

TABLE III

GEL PERMEATION CHROMATOGRAPHIC CHARACTERIZATION OF POLYURETHANE BINDERS AND THIXOTROPES

| | Thixotrope Resins | | | |
|---|---|---|---|---|
| # | Capping Group | $M_N$ | $M_W$ | $M_W/M_N$ |
| 101 | ethanolamine | 1000 | 3600 | 3.6 |
| 102 | diethanolamine | 1000 | 3700 | 3.7 |
| 103 | triethanolamine | 1000 | 3400 | 3.4 |
| 201 | ethanolamine | 1300 | 3400 | 2.6 |
| 202 | diethanolamine | 1400 | 4100 | 2.9 |
| 203 | triethanolamine | 1400 | 5100 | 3.6 |

Both molecular weight and branching coefficients were found to have a significant effect on sag resistance. Those resins with a branching coefficient of 0.22 were nearly linear while those with a higher value of about 0.8 were highly branched. The free isocyanate content was significant in that it affected the amount of monomeric diurea formed when the resins were capped with N,N-diethanolamine. In order to determine the effects of formulation changes on the application and flow behavior of the coatings, a standard test procedure was developed. The degree of sag was determined by measuring the length of the flow line at the top of a 10 cm wide panel at a position 2.5 cm from the edge. A set of control panels was made using a like paint without urea flow control agents for each set of test panels.

a homogeneous, clear viscous wax with a solids content of 73 wt%.

Five percent by weight of the capped urethane was added to resin 1 and resin 2 (Table II). As set forth in Table IV and FIG. 1, sagging was reduced in all coatings although the effect was much greater in white enamels than in clear coats.

TABLE IV

Effects of Binder Urethane, Pigment and Thixotrope Termination on the Application and Coating Properties of Urethane-Melamine Enamels

| Resin # | Thioxtrope # | Conc. (Wt %)[a] | P:B[b] | Zahn 2 Viscosity[2] (Seconds) | 20° Gloss | Thickness Microns | Average Sag (mm) | (% of Control) |
|---|---|---|---|---|---|---|---|---|
| 1 | none | — | 40 | 28.4 | 89 | 63 | 27 | 100 |
|   |      |   |    |      | 89 | 26 | 9  | 100 |
| 1 | 101 | 5 | 40 | 28.0 | 83 | 63 | 12 | 44 |
|   |     |   |    |      | 84 | 26 | 5  | 55 |
| 1 | 102 | 5 | 40 | 35.2 | 80 | 57 | 6  | 19 |
|   |     |   |    |      | 84 | 24 | 2  | 22 |
| 1 | 103 | 5 | 40 | 39.3 | 63 | 62 | 1  | 4 |
|   |     |   |    |      | 58 | 25 | 0  | 0 |
| 1 | none | — | 0 | 44.4 (34.9)[d] | >90 | 58 | 71 | 100 |
| 1 | 202 | 5 | 0 | 46.2 (36.2)[d] | >90 | 60 | 56 | 79 |
| 1 | 203 | 5 | 0 | 53.1 (36.7)[d] | >90 | 66 | 49 | 69 |
| 2 | none | — | 40 | 29.7 | 84 | 50 | 12 | 100 |
| 2 | 201 | 5 | 40 | 28.9 | 79 | 54 | 4 | 33 |
| 2 | 202 | 5 | 40 | 28.9 | 78 | 51 | 2 | 17 |
| 2 | 203 | 5 | 40 | 33.9 | 62 | 49 | 0 | 0 |

[a]based on binder solids
[b]Grams of pigment/100 grams of binder resin
[c]Spray viscosity at 60 wt % solids, reduction solvent was a mixture of 4:2:1:1 2-pentanone, methyl Cellosolve ®, butyl Cellosolve ® any butyl Carbitol ®
[d]Spray solids of clear coats was 55 wt %

The absolute sag values were corrected for a nominal film thickness of 52 microns. To accomplish this, samples of each paint without flow control agents were prepared. Sag was plotted as a function of thickness for these unmodified paints.

EXAMPLES

A mixture of 17.1 g (33.5 milliequivalents) Pluracol ® P1010 diol, 18.4 g (129 milliequivalents) Pluracol ® TP440 triol, 64.8 g (494.7 milliequivalents) Hylene ® W diisocyanate and 50 g dry acetone were mixed together in an 8 ounce bottle. Next, one drop (about 0.02 g) dibutyltin dilaurate catalyst was added. The sample was capped and shaken briefly and then allowed to stand overnight.

The isocyanate-terminated resin is next added dropwise to solution containing a stoichiometric amount N,N-diethanolamine, i.e., one mole of amine for each equivalent of isocyanate functionality. After standing for about an hour, the solution is worked up and the flow control agent isolated by one of two techniques. If no attempt is made to remove the monomeric capped diisocyanate species, then the mixture is simply concentrated under vacuum on a rotary evaporator. The product so obtained was a waxy white solid with a nonvolatile content of 79 wt%.

Alternatively, it is possible to remove the monomeric species prior to isolating the flow control agent. In this case, the reaction mixture containing the N,N-diethanolamine capped resin is diluted in a sufficiently large volume of acetone to dissolve the polymeric resin species, and the insoluble diurea is simply removed by filtration. After the monomeric diurea has been removed, the remaining polymeric species are concentrated on a rotary evaporator. This time the product is Increasing the degree of substitution on the terminal urea groups decreased sagging. This was generally accompanied by an increase in viscosity and a loss of gloss which was especially severe with the triethanolamine capped thixotropes.

Increasing the molecular weight of the urethane binder to 1600 (Resin 2) and changing the structure of the isocyanate-terminated precursor (P200) used to synthesize the thixotropes greatly reduced the amount of sagging. For instance, sagging was not detectable in 2 mil thick pigmented coatings with the triethanolamine capped thixotrope (203). However, the gloss and viscosity values were not acceptable. The diethanolamine capped thixotrope (202), on the other hand, gave a good combination of initial gloss, viscosity and sag control although sagging was still detectable at film thickness of 2 mils. The monoethanolamine thixotrope (201), did not adversely affect either gloss or viscosity, but it was much less effective in controlling sagging.

Figure 2:
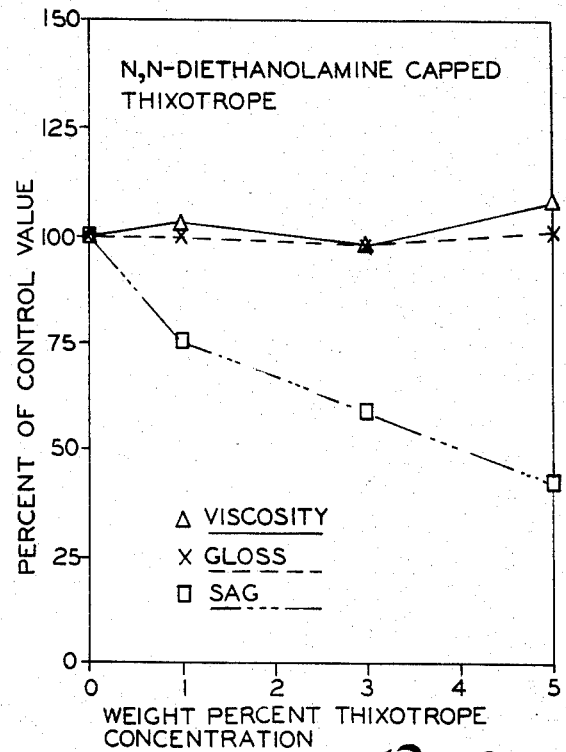
FIG. 2 is a plot showing the effect of incorporating different concentrations of N,N-diethanolamine capped urethane resins in white melamine cured enamels.

After considering the combined properties of gloss, viscosity and sag control, further experiments with thixotropes (202) and (203) were initiated to see if a more optimum thixotrope concentration could be found (table V). No acceptable combination of gloss, viscosity and sag control was discovered for the triethanolamine capped thixotropes. By contrast, the presence of 1 to 5 weight percent of the diethanolamine resin (202) had virtually no adverse effects on gloss or viscosity, while sagging was reduced to as little as 40% that of the controlled coating (FIG. 2). It is to be noted that this value is roughly twice the amount of sagging previously observed with resin 202 (17% in table IV). The difference is directly attributable to the solvent formulation change that was required to improve both the gloss and storage stability of the coatings.

TABLE V

The Effect of Thixotrope Concentration on the Application and Coating Properties of White Urethane-Melamine Enamels

| Resin # | Thixotrope # | Thixotrope Conc. (Wt %)[a] | P:B[b] | Zahn 2 Viscosity[c] (Seconds) | 20° Gloss | Thickness Microns | Average Sag (mm) | Average Sag (% of Control) |
|---|---|---|---|---|---|---|---|---|
| 2 | none | 0 | 40 | 26.2 | 82 | 56 | 12 | 100 |
| 2 | 203 | 1 | 40 | 32.4 | 63 | 56 | 4 | 33 |
| 2 | 203 | 2 | 40 | 29.4 | 56 | 51 | 0 | 0 |
| 2 | 203 | 3 | 40 | 30.2 | 52 | 53 | 0 | 0 |
| 2 | 203 | 5 | 40 | 33.9 | 53 | 49 | 0 | 0 |
| 2 | none | 0 | 40 | 28.7 | 84 | 56 | 12 | 100 |
| 2 | 202 | 1 | 40 | 29.6 | 84 | 54 | 9 | 75 |
| 2 | 202 | 3 | 40 | 28.3 | 82 | 52 | 7 | 58 |
| 2 | 202 | 5 | 40 | 31.1 | 85 | 53 | 5 | 42 |

[a] based on binder solids
[b] Grams of pigment/100 grams of binder resins
[c] at 60 wt % solids; the reduction solvent was a mixture of 4:2:1:1 2-pentanone ketone, methanol, methyl Cellosolve ® and butyl Carbitol ®

Experiments were also performed to determine whether changes in the urethane structure of these resins could further improve their effectiveness as flow control agents. To this end a series of eight isocyanate-terminated resins was prepared (table VI), and end-capped with diethanolamine. The primary variables were the molecular weights of the polyether diol and triol precursors, the expected degree of polymerization of the resulting urethane resin (excluding monomer), and the amount of branching. One additional factor, the residual monomeric diisocyanate content, was also important since it determined the amount of nonpolymeric diurea that formed as a co-product during the capping reaction.

TABLE VI

STRUCTURAL CHARACTERIZATION OF POLYURETHANE COATING FLOW CONTROL RESINS

| Resin No. | DP(N) Chains | Initial NCO:OH | Branching Coefficient | Equivalent Weight of Diol | Equivalent Weight of Triol | Equivalent Weight of Diisocyanate | MN[a] ALL | MN[b] Chains | Wt % Residual Diisocyanate |
|---|---|---|---|---|---|---|---|---|---|
| P301 | 10 | 2.00 | .80 | 525 | 520 | 131 | 2135 | 5484 | 8.4 |
| P302 | 6 | 2.00 | .22 | 525 | 520 | 131 | 1692 | 3049 | 8.4 |
| P303 | 10 | 1.43 | .22 | 525 | 142 | 131 | 3545 | 5252 | 2.7 |
| P304 | 6 | 3.00 | .80 | 525 | 142 | 131 | 698 | 1949 | 28.9 |
| P305 | 10 | 1.43 | .22 | 212 | 520 | 131 | 2638 | 3908 | 3.6 |
| P306 | 6 | 3.00 | .80 | 212 | 520 | 131 | 970 | 2708 | 20.8 |
| P307 | 10 | 2.00 | .80 | 212 | 142 | 131 | 1140 | 2927 | 15.7 |
| P308 | 6 | 2.00 | .22 | 212 | 142 | 131 | 988 | 1780 | 14.3 |

[a] Calculated number average molecular weight of all polymer species.
[b] Calculated number average molecular weight excluding monomer.

Figure 3:
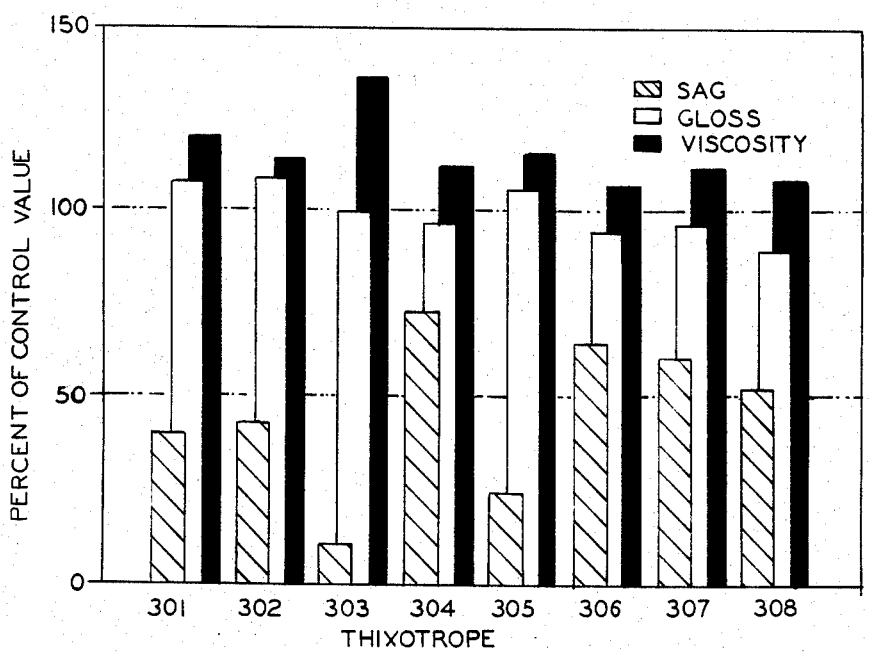
FIG. 3 is a bar chart showing the properties of sag, gloss and viscosity for several different urea terminated urethane thixotropies on the properties of white melamine cured enamels.

As seen in FIG. 3 and table VII, the addition of 5 wt% of the diethanolurea thixotropes to 40 P:B white urethane-melamine enamels had little effect on the coating viscosity and virtually no effect at all on the gloss. Sagging, however, was reduced to as little as 11% (thixotrope #303) of the control coating which contained no thixotrope.

TABLE VII

EFFECT OF URETHANE STRUCTURE OF DIETHANOLUREA-TERMINATED THIXOTROPES ON APPLICATION AND COATING PROPERTIES OF WHITE ENAMELS

| Thixotrope[a] No. | (Wt %) | P:B[b] | Viscosity[c] (Z-2 Sec) | Initial Gloss (20°) | Thickness (Microns) | Ave. Sag (mm) | Ave. Sag (%) | Corrected Sag (mm) | Corrected Sag (%) |
|---|---|---|---|---|---|---|---|---|---|
| None | — | 40 | 29.5 | 79 | 50 | 29 | 100 | 29 | 100 |
| 301 | 5 | 40 | 35.5 | 85 | 45 | 9 | 30 | 12 | 40 |
| 302 | 5 | 40 | 33.6 | 86 | 48 | 11 | 39 | 12 | 43 |
| 303 | 5 | 40 | 40.0 | 79 | 54 | 6 | 19 | 3 | 11 |
| 304 | 5 | 40 | 32.8 | 77 | 50 | 21 | 73 | 21 | 73 |
| 305 | 5 | 40 | 34.2 | 84 | 50 | 7 | 25 | 7 | 25 |
| 306 | 5 | 40 | 31.5 | 75 | 52 | 20 | 68 | 19 | 65 |
| 307 | 5 | 40 | 33.0 | 77 | 46 | 15 | 53 | 17 | 61 |
| 308 | 5 | 40 | 32.3 | 71 | 54 | 18 | 61 | 15 | 53 |

[a] Based on resin solids.
[b] Grams of pigment/100 grams of resin solids.
[c] At 60 wt % solids, reduced with 4:2:1:1 2-pentanone:methanol:methyl cellosolve:butyl cellosolve.

These data have fully demonstrated that the addition of small amounts of novel diethanolamine terminated urethane-urea resins to the malamine-cured urethane enamels provided greatly reduced sagging without compromising other desirable coating properties.

While our invention has been described in terms of a preferred embodiment thereof, it is to be appreciated that those skilled in the art will readily apply these teachings to other possible variations of the invention.

The embodiments of the invention in which an exclusive property or privilege is claimed are defined as follows:

1. A thixotropic flow control agent compatible with sprayable urethane paint compositions being an uncrosslinked oligomeric urea reaction product of an isocyanate-terminated prepolymer and an ethanolamine selected from the group consisting of monoethanolamine, diethanolamine, and triethanolamine, said flow control agent when added to a polyurethane paint composition preferably pigmented, reduces sagging of said paint during spraying.

2. A sprayable high solids coating composition which produces a durable, high gloss surface finish when applied to and cured over a suitable substrate, said composition comprising a urethane binder resin being a reaction product of an aliphatic polyisocyanate and a stoichiometric excess with respect to the polyisocyanate of polyether polyols, a thixotropic flow control agent of uncrosslinked urethane-urea oligomer which improves the sagging property of said paint when applied to vertically oriented substrates without adversely affecting the viscosity and gloss properties, said agent being an uncrosslinked oligomeric urea reaction product of an isocyanate-terminated prepolymer and an ethanolamine selected from the group consisting of monoethanolamine, diethanolamine, and triethanolamine, said coating composition being cured by cross-linking said urethane binder resin by a suitable cross-linking agent.

3. A sprayable high solids coating composition of a desirable color which produces a durable, high gloss surface finish when applied to and cured over a suitable substrate, said composition comprising a urethane binder resin being a reaction product of an aliphatic polyisocyanate and a stoichiometric excess with respect to the polyisocyanate of polyether polyols, a thixotropic flow control agent of uncrosslinked urethane-urea oligomer which improves the sagging property of said paint when applied to vertically oriented substrates without adversely affecting the viscosity and gloss properties, said agent being an uncrosslinked oligomeric urea reaction product of an isocyanate-terminated prepolymer and an ethanolamine selected from the group consisting of monoethanolamine, diethanolamine, and triethanolamine, said coating composition being cured by cross-linking said urethane binder resin by means of an acid catalyzed melamine cross-linking agent.

* * * * *